United States Patent
Conklin

[11] Patent Number: 6,132,497
[45] Date of Patent: Oct. 17, 2000

[54] DUST SUPPRESSION SYSTEM

[75] Inventor: Randall L. Conklin, Waynesburg, Pa.

[73] Assignee: RAG American Coal Company, Linthicum Heights, Md.

[21] Appl. No.: 09/208,532

[22] Filed: Dec. 9, 1998

Related U.S. Application Data

[60] Provisional application No. 60/079,951, Mar. 30, 1998.

[51] Int. Cl.[7] .................................................. B01D 47/00
[52] U.S. Cl. ................................. 96/239; 96/273; 96/356; 96/362; 95/223
[58] Field of Search ............................. 96/223, 239, 273, 96/354, 356, 357, 362; 95/223, 225; 55/413, 414, 415, 302

[56] References Cited

U.S. PATENT DOCUMENTS

| | | |
|---|---|---|
| 2,737,997 | 3/1956 | Himmelheber et al. ................. 425/145 |
| 3,435,593 | 4/1969 | Nordone ..................................... 96/372 |
| 3,757,491 | 9/1973 | Gourdine ................................... 96/223 |
| 4,266,951 | 5/1981 | Calvert ...................................... 95/354 |
| 4,334,897 | 6/1982 | Brady et al. ............................... 96/356 |
| 4,380,353 | 4/1983 | Campbell et al. ......................... 96/424 |
| 4,717,404 | 1/1988 | Fore .......................................... 96/357 |
| 4,880,447 | 11/1989 | Bloch ....................................... 95/225 |
| 5,253,925 | 10/1993 | Mopzik, Jr. ............................... 96/356 |
| 5,562,746 | 10/1996 | Raether .................................... 55/302 |
| 5,713,970 | 2/1998 | Raring ...................................... 96/239 |
| 5,803,955 | 9/1998 | Raring ...................................... 96/239 |

OTHER PUBLICATIONS

Copy of p. 14 of FullJet Product brochure (undated).
The Random House College Dictionary, 1982 Revised Edition by Random House, Inc., p. 1460).

Primary Examiner—David A. Simmons
Assistant Examiner—Minh-Chau T. Pham
Attorney, Agent, or Firm—Bruce E. Dahl, Esq.; Dahl & Osterloth, L.L.P.

[57] ABSTRACT

A dust suppression system for suppressing dust associated with a movement of dust producing material along an open conduit may include a hood assembly positioned adjacent the open conduit so that the hood assembly defines an interior chamber that is exposed to the dust producing material contained within the open conduit. A baffle member mounted to the hood assembly divides the interior chamber into an inlet chamber and an outlet chamber. A venturi assembly having an inlet end and an outlet end is mounted to the baffle member so that the inlet end of the venturi assembly is exposed to the inlet chamber and so that the outlet end of the venturi assembly is exposed to the outlet chamber. A pressurized fluid provided to the venturi assembly causes the venturi assembly to pull dust laden air contained within the inlet chamber to the outlet chamber, the fluid combining with a portion of the dust suspended in the dust laden air to suppress a release of dust into a surrounding atmosphere.

21 Claims, 6 Drawing Sheets

DUST SUPPRESSION SYSTEM

REFERENCE TO CO-PENDING PROVISIONAL APPLICATION

Applicants hereby claim the benefit of an earlier filed co-pending provisional application, Application No. 60/079,951, filed on Mar. 30, 1998, which is incorporated herein by reference for all that it discloses.

FIELD OF INVENTION

This invention relates to dust suppression systems in general and more specifically to dust suppression systems for suppressing dust associated with a movement of a dust producing material along an open conduit.

BACKGROUND

Coal crushing apparatus are commonly used in longwall coal mining operations to perform a preliminary size reduction on the coal removed from the face of the mine by the longwall shearing machine. The crushed coal thereafter may be removed from the crusher by a suitable conveyer system, such as a "stage loader," although other types of haulage systems (e.g., shuttle cars) may also be used. If a "stage loader" type of conveyer system is used, then the crushed coal is carried away in a continuous manner. If shuttle cars are used, then the coal is carried away in separate loads in a "batch" type process. Coal crushers and stage loaders may also be used in other types of coal mining methods (e.g., shortwall, continuous, etc.), although the longwall mining method is probably the most commonly used method for mining coal today.

Regardless of the particular mining system that is used to extract the coal, control of dust generated during the mining operation is always a critical concern. For example, not only can excessive amounts of airborne dust pose a hazard to mining personnel, high airborne dust levels can pose a significant explosion hazard. One piece of mining equipment that can add to the dust problem is the coal crusher that is used to crush the coal removed from the face by the mining apparatus (e.g., a longwall shearing machine, a continuous miner, etc). Most coal crushers are of the hammer mill type and comprise a rotating drum having a plurality of hammers attached near the periphery of the drum. While the hammers are effective in crushing the coal, they can result the production of significant quantities of dust. While most coal crushers are provided with various types of covers or shields to prevent most of the dust from escaping, some dust almost always escapes, particularly through the coal inlet and outlet ends of the crusher. Another problem is that the rotating drum and hammer assembly tends to act as an air pump, and can induce a significant air flow through the crusher. The air flow induced by the rotating drum and hammers complicates the dust containment problem.

Various types of scrubber systems have been developed in attempts to control the dust generated by the various mining machinery (including coal crushers) that are located at or near the face of the mine. While such scrubber systems are effective in reducing the ambient dust levels, they are not without their problems. For example, most scrubber systems require the provision of electrical power which, while generally available at the mine face, presents yet another complication and cost associated with the mining operation. Such scrubber systems may also contain one or more filters which must be maintained or periodically changed. Many scrubber systems can also generate significant noise levels which add to the noise levels produced by other mining apparatus that may be located nearby.

Consequently, a need exists for a dust control system that is effective at suppressing dust produced by coal crushers that does not suffer the disadvantages of currently available scrubber systems.

SUMMARY OF THE INVENTION

A dust suppression system for suppressing dust associated with a movement of a dust producing material along an open conduit may comprise a hood assembly positioned adjacent the open conduit so that the hood assembly defines an interior chamber that is exposed to the dust producing material contained within the open conduit. A baffle member mounted to the hood assembly divides the interior chamber into an inlet chamber and an outlet chamber. A venturi assembly having an inlet end and an outlet end is mounted to the baffle member so that the inlet end of the venturi assembly is exposed to the inlet chamber and so that the outlet end of the venturi assembly is exposed to the outlet chamber. A pressurized fluid provided to the venturi assembly causes the venturi assembly to pull dust contained within the inlet chamber to the outlet chamber. The fluid used to operate the venturi combines with a portion of the dust thereby suppressing a release of dust into a surrounding atmosphere.

Also disclosed is a method for suppressing dust associated with the movement of a dust producing material along an open conduit which comprises the steps of placing a dust suppression hood adjacent the open conduit so that the dust suppression hood defines an inlet chamber and an outlet chamber; and providing a fluid under pressure to a venturi extending between the inlet and outlet chambers so that the fluid causes the venturi to pull dust contained within the inlet chamber to the outlet chamber, the fluid combining with a portion of the dust to suppress a release of dust into a surrounding atmosphere.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
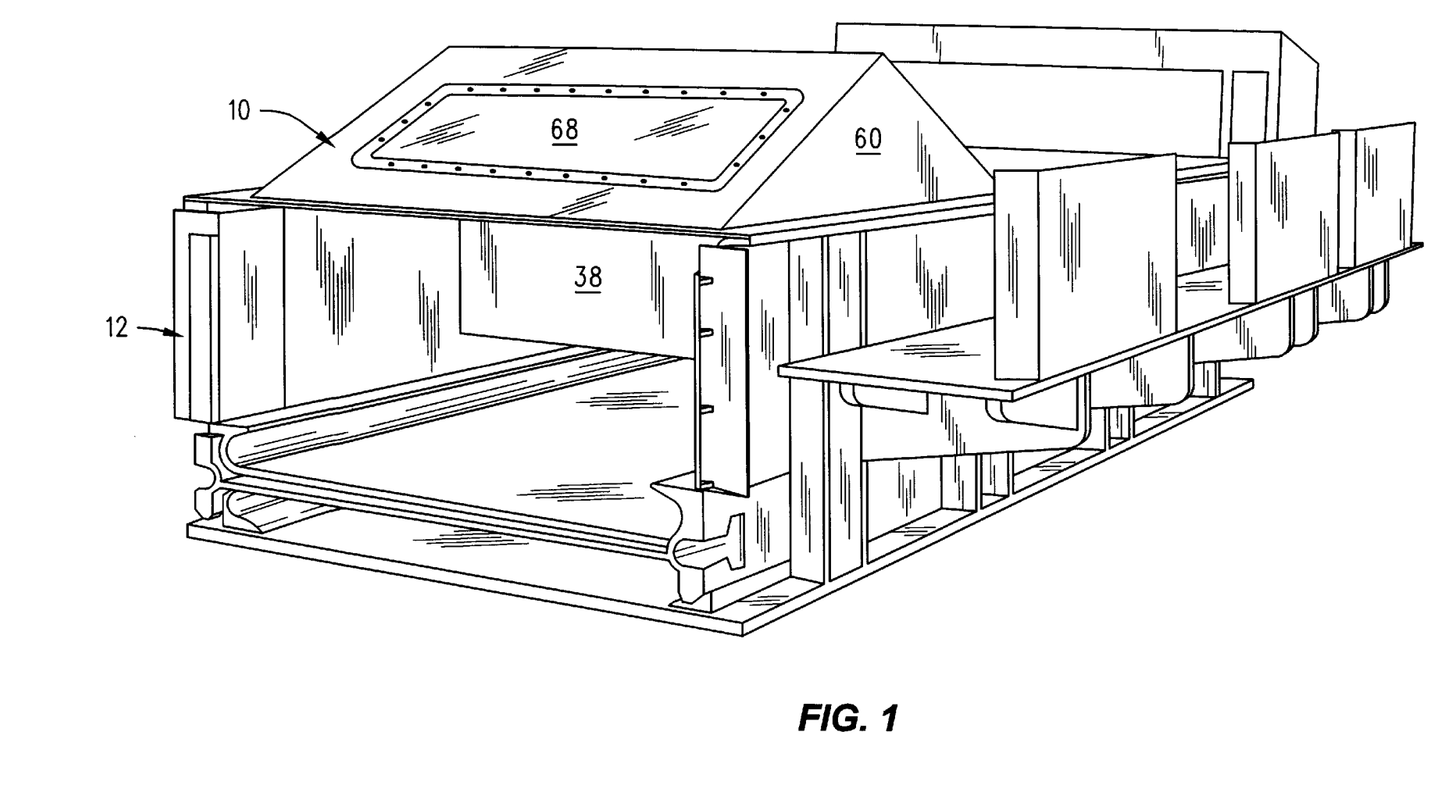
FIG. 1 is a perspective view of a dust suppression system installed on the inlet end of a stage loader of the type commonly used to carry away coal from a coal crusher.
Figure 2:
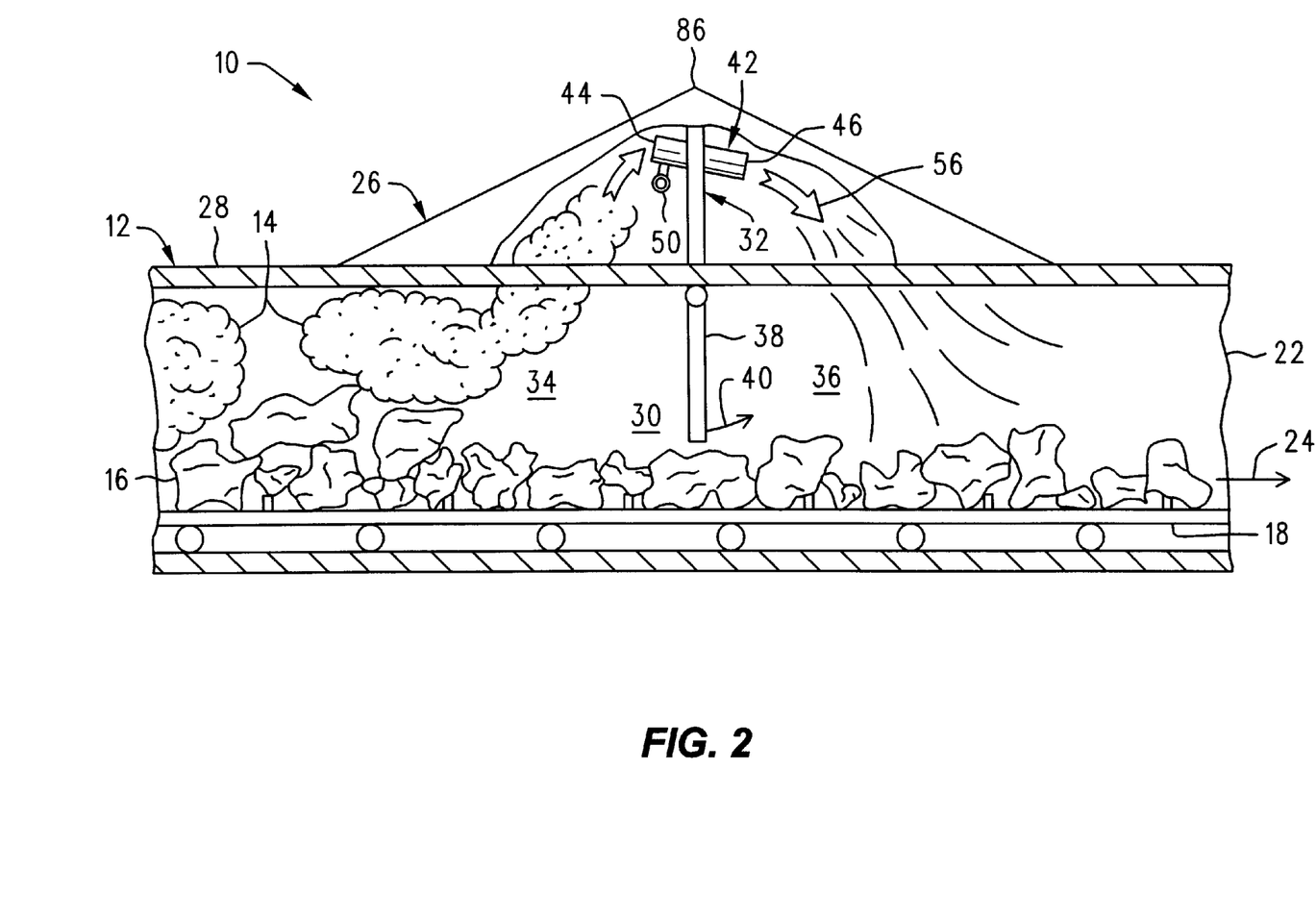
FIG. 2 is a cross-section view in elevation of the dust suppression system and stage loader device shown in FIG. 1.

A dust suppression system 10 according to the present invention is shown in FIGS. 1 and 2 as it could be used in conjunction with a "stage loader" apparatus 12 of the type commonly used in underground coal mining operations. In such an application, the dust suppression system 10 suppresses dust (shown schematically at 14) associated with the transport of coal 16 along a conveyer system 18 on the stage loader apparatus 12. Alternatively, and as will be explained in greater detail below, the dust suppression system 10 may be used in conjunction with any of a wide range of other types of open conduit material transport systems (e.g., conveyer belt systems) to suppress dust associated with the movement of any of a wide range of other types of dust producing materials along such open conduit systems.

The stage loader apparatus 12 on which the dust suppression system 10 may be used may comprise one element of a haulage system for transporting coal from the mine face to the surface in an underground "longwall" coal mining operation. More specifically, the stage loader apparatus 12 may comprise an "intermediate" haulage system which receives coal 16 from a "face" haulage system and which discharges coal 16 onto a "main" haulage system. In accordance with the foregoing haulage configuration, then, the conveyer system 18 associated with the stage loader 12 transports coal 16 from an inlet end 20 of the stage loader 12 to an outlet end 22 of the stage loader 12. That is, the conveyer system 18 transports coal 16 from left to right, generally in the direction of arrow 24. In the application shown and described herein, a coal crusher apparatus (not shown) is positioned adjacent the inlet end 20 of stage loader 12 and may be used to perform a preliminary size reduction on the coal received from the face haulage system (also not shown). The coal crusher apparatus (not shown) tends to produce substantial amounts of coal dust 14, which is generally suspended in the atmosphere located above the coal 16 being transported by the conveyer system 18.

The dust suppression system 10 may comprise a hood assembly 26 that is sized to be received by the top portion 28 of the inlet end 20 of stage loader 12, as best seen in FIGS. 1 and 2. The hood assembly 26 therefore defines an interior chamber 30 that is exposed to the coal 16 moving along the conveyer system 18 of the stage loader 12. A baffle member 32 mounted to the hood assembly 26 divides the interior chamber 30 into an inlet chamber 34 and an outlet chamber 36. The baffle member 32 may be provided with a lower baffle member 38 which extends toward the conveyer system 18 of stage loader 12 and terminates in close proximity to the coal 16 being transferred along the conveyer system 18. The lower baffle member 38 helps to prevent dust 14 contained in the inlet chamber 34 from bypassing the dust suppression system 10 and migrating directly to the outlet chamber 36. In one embodiment, the lower baffle member 38 may be hinged to the upper baffle member 32 to allow the lower baffle member 38 to swing in the direction indicated by arrow 40, if necessary, to accommodate an increased thickness of the coal bed or larger pieces of coal 16 traveling on the conveyer system 18 of stage loader 12.

Figure 5:
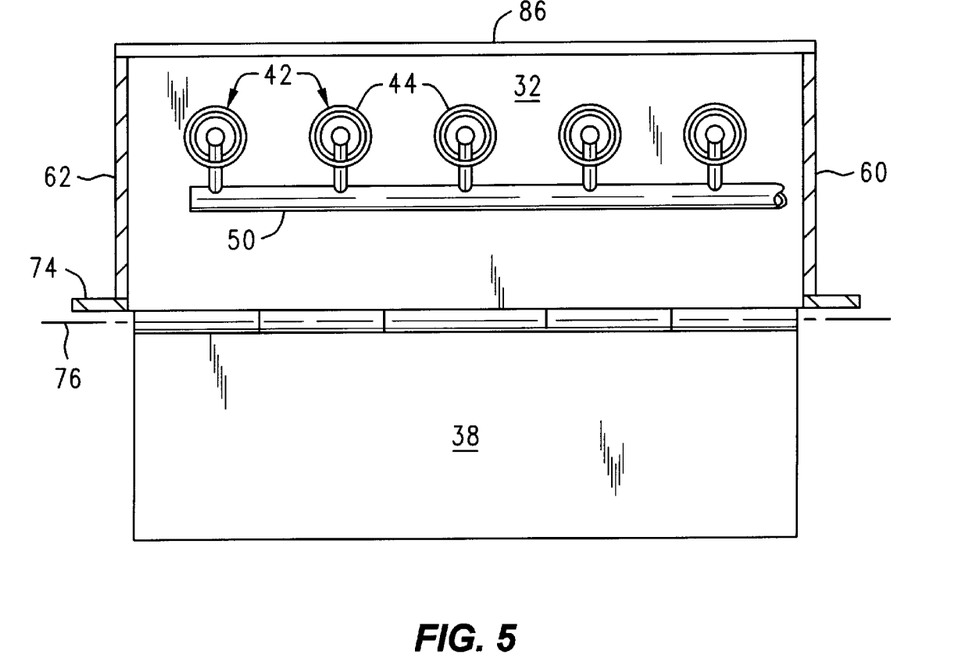
FIG. 5 is an elevation view of the inlet chamber side of the baffle plate showing the arrangement of the venturi assemblies mounted therein.
Figure 6:
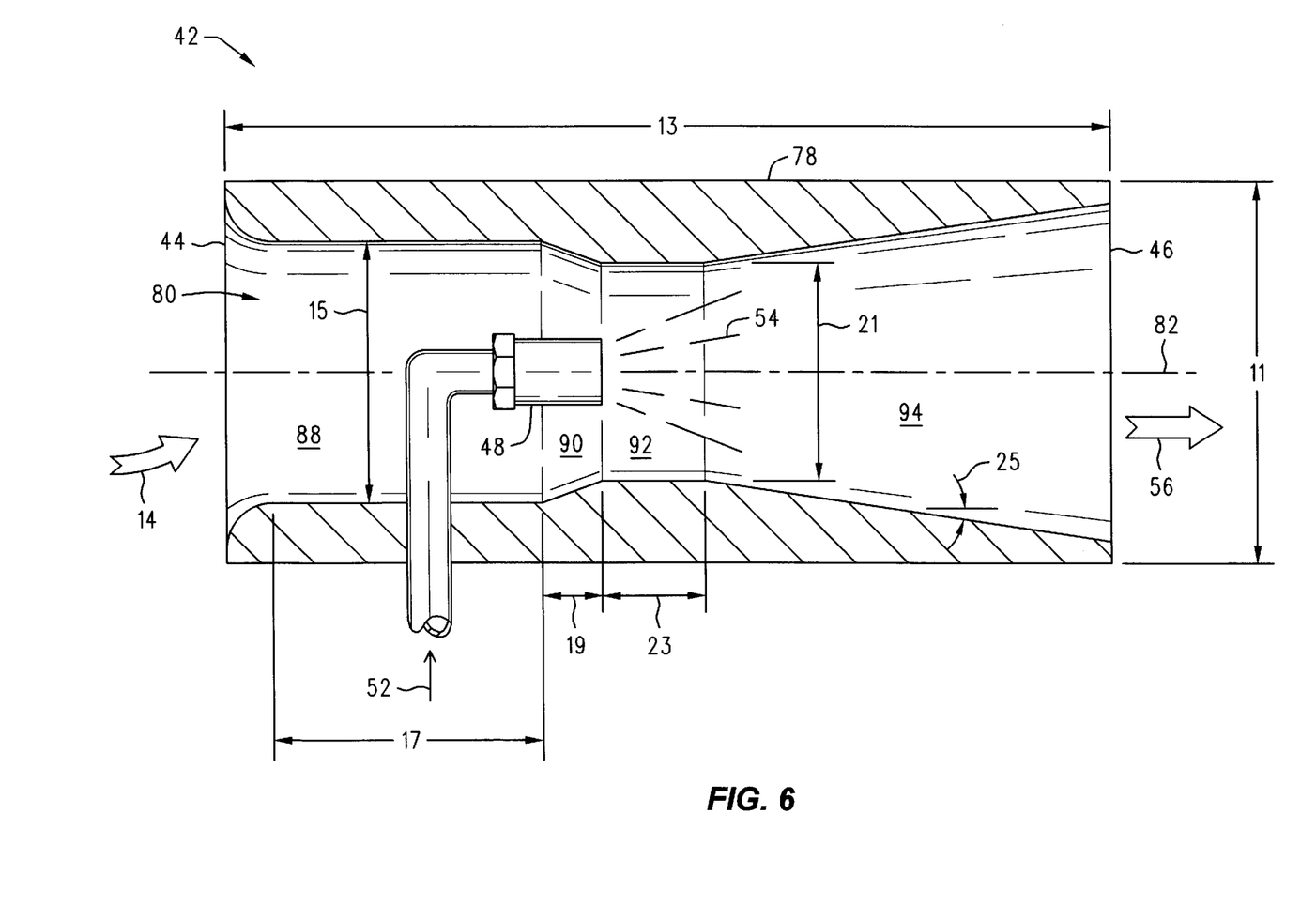
FIG. 6 is a cross-section view in elevation of a venturi assembly more clearly showing the arrangement of the venturi tube and injector nozzle.

The dust suppression system 10 may be provided with one or more venturi spray assemblies jet 42 pumps. The venturi spray assemblies or jet pumps 42 pump or move air from the inlet chamber 34 to the outlet chamber 36 in a manner that will be described in greater detail below. In one preferred embodiment, the venturi spray assemblies or jet pumps 42 are mounted to the upper baffle member 32 so that the venturi spray assemblies 42 extend between the inlet chamber 34 and the outlet chamber 36 in the manner best seen in FIG. 2. Referring now to FIGS. 2 and 6, each venturi assembly 42 may comprise a converging-diverging nozzle or venturi having an inlet end 44 and an outlet end 46. In one preferred embodiment, each venturi assembly 42 is mounted to the baffle member 32 so that the inlet end 44 is exposed to the inlet chamber 34 and so that the outlet end 46 is exposed to the outlet chamber 36. Each venturi assembly 42 may be provided with an injector nozzle 48 (FIG. 6) that is connected to a source (not shown) of a pressurized "working" fluid 52 (e.g., water) via a distribution manifold 50, as best seen in FIGS. 2 and 5.

The dust suppression system 10 may be operated as follows to suppress dust 14 associated with the movement of coal 16 along the conveyer system 18 of the stage loader system 12. Assuming that the coal crusher (not shown) connected to the inlet end 20 of stage loader 12 is operating and generating crushed coal 16 and dust 14, dust 14 and coal 16 enter the inlet end 20 of the stage loader 12. The conveyer system 18 carries the coal 16 towards the outlet end 22, i.e., generally in the direction of arrow 24. The coal dust 14 entrained in the air above the coal 16 may have associated with it substantial velocity vectors (not shown) as a result of the action of the coal crusher (not shown). Consequently, the coal dust 14 typically comprises a turbulent flow and tends to escape through any small gaps or holes that may be present in the crusher (not shown) or stage loader apparatus 12. The dust suppression system 10 may be activated by supplying a pressurized working fluid (e.g., water 52, FIG. 6) to the venturi assemblies 42. The resulting fluid stream 54 produced by each injector nozzle 48 causes dust laden air 14 to be drawn in the inlet end 44 of each venturi 42. The dust particles in the dust laden air 14 mix with the working fluid 52 (e.g., water 52) in the fluid stream 54. The resulting mixture is discharged from the outlet end 46 of each venturi assembly 42 as a particle laden mist stream 56. That is, each venturi assembly 42 operates as a jet pump to pump or move air from the inlet chamber 34 to the outlet chamber 36. Since the outlet ends 46 of the venturi spray assemblies 42 are directed generally toward the conveyer system 18, the coal dust 14 entrained in the particle laden mist stream 56 discharged from the venturi sprays 42 tends to fall on the coal 16 traveling on the conveyer system 18 thereby allowing the formerly airborne coal dust particles to be carried away with the coal 16. The baffle member 32 and lower baffle member 38 provide separation between the inlet and outlet chambers 34 and 36, thereby substantially preventing dust 14 from bypassing the venturi spray assemblies 42 and escaping directly into the outlet chamber 36 from underneath the lower baffle member 38.

A significant advantage associated with the dust suppression system 10 according to the present invention is that it achieves a significant reduction in the dust escaping from the coal crusher and adjacent stage loader apparatus 12, without requiring filters or other apparatus for mechanically trapping the dust. The dust suppression system 10 also does not require the provision of electricity, thereby simplifying installation and operation. Another advantage of the present invention is that it is quiet in operation.

Having briefly described the dust suppression system 10 according to one embodiment of the present invention, as well as some of its more significant features and advantages, the various preferred embodiments of the dust suppression system will now be described in detail. However, before proceeding with the detailed description, it should be noted that while the dust suppression system is shown and described herein as it could be used to suppress dust associated with the movement of coal in an underground mining environment, the dust suppression system could be used in any of a wide range of other applications and in conjunction with any of a wide range of other dust producing materials. Consequently, the present invention should not be regarded as limited to the particular applications and dust producing materials shown and described herein.

With the foregoing considerations in mind, one preferred embodiment of the dust suppression system 10 according to the present invention is shown and described herein as it could be used with a stage loader apparatus 12 of the type commonly used in underground coal mining operations. More specifically, the dust suppression system 10 suppresses dust 14 associated with the transport of coal 16 along an "open conduit" transport system (e.g., conveyer system 18) associated with the stage loader apparatus 12. As used herein, the term "open conduit" transport system refers to any transport system or device, a portion of which is open to the surrounding atmosphere so that a dust producing material carried by the transport system is exposed to the surrounding atmosphere as the dust producing material is transported along the transport system. Examples of open conduit transport systems include, but are not limited to, chain conveyer systems and belt conveyer systems.

As was briefly mentioned above, the stage loader apparatus 12 may comprise a portion of the overall haulage system utilized in an underground coal mining operation to transport coal from the face to the exterior of the mine. For example, in the embodiment shown and described herein, the stage loader system 12 may comprise an "intermediate" haulage system which receives coal 16 from a "face" haulage system and which discharges coal 16 onto a "main" haulage system. By way of example, the "face" haulage system may comprise a chain conveyer system (not shown) of the type commonly used to remove coal dislodged from the face by a "longwall" type of continuous miner. Alternatively, other types of face conveyer systems and mining systems could be used. The "main" haulage system may comprise any of a wide range of conveyer systems suitable for transporting to the surface of the mine coal 16 discharged from the stage loader 12. By way of example, in one preferred embodiment, the main haulage system may comprise an open belt conveyer system of the type that is well-known in the art and readily commercially available. Alternatively, other types of main haulage systems, such as rail cars (i.e., tracked haulage) or rubber-tired cars (i.e., trackless haulage) may also be used.

In accordance with the foregoing haulage configuration, the conveyer system 18 associated with the stage loader 12 transports coal 16 from an inlet end 20 of the stage loader 12 to an outlet end 22 of the stage loader 12. That is, the conveyer system 18 of the stage loader apparatus 12 transports coal 16 from left to right, generally in the direction of arrow 24. A coal crusher apparatus (not shown) may be positioned adjacent the inlet end 20 of stage loader 12 and may be used to perform a preliminary size reduction on the coal received from the face haulage system (not shown). Alternatively, the inlet end 20 of stage loader 12 may be connected to other types of devices or systems. In still another variation, the inlet end 20 of stage loader 12 may receive coal directly from the face haulage system. The coal crusher apparatus (not shown) tends to produce substantial amounts of coal dust 14, which is generally suspended in the atmosphere located above the coal 16 being transported by the conveyer system 18 of stage loader 12. The coal crusher apparatus used in such an application may be of the rotating hammer-mill type, thus tends to impart significant velocities to the dust particles 14, which makes it difficult to contain the dust particles. Indeed, it is not uncommon for the coal dust 14 to be discharged from nearly every nook and cranny that may exist in the housing of coal crusher itself, as well as in the housings of any nearby "downstream" machinery.

Figure 3:
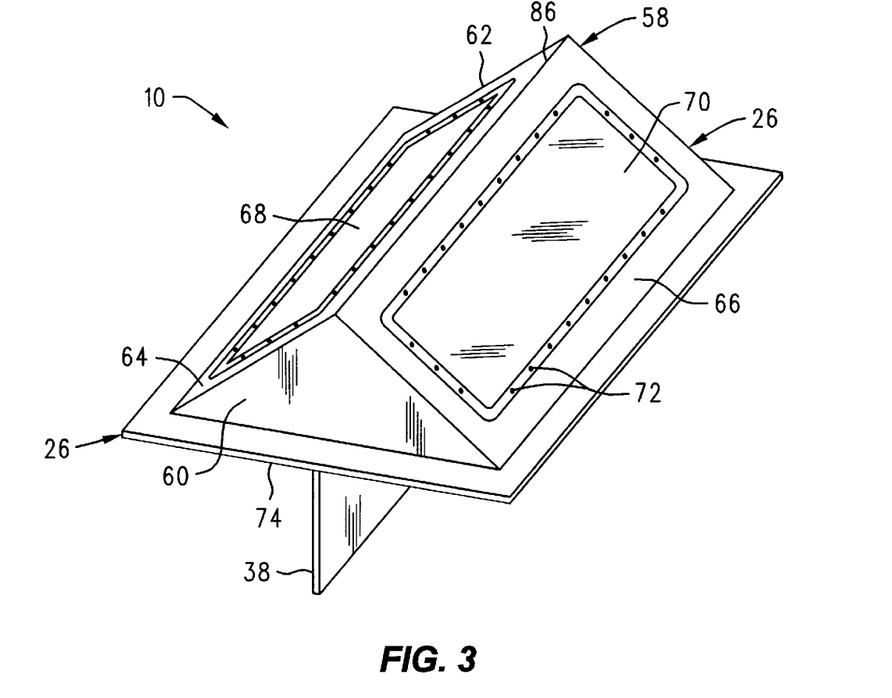
FIG. 3 is a perspective view of the dust suppression system.
Figure 4:
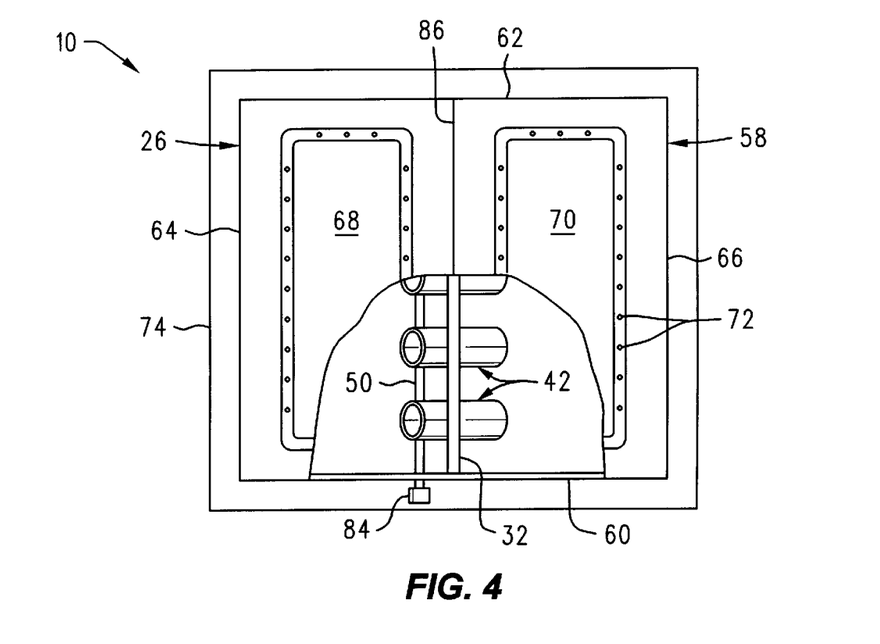
FIG. 4 is a plan view of the dust suppression system with a portion of the hood assembly broken away to show the venturi assemblies.

Referring now primarily to FIGS. 2–4, the dust suppression system 10 may comprise a hood assembly 26 that is sized to be received by the top portion 28 of the inlet end 20 of stage loader 12. See also FIG. 1. The hood assembly 26 may comprise a top member 58 to which are attached a pair of side members 60 and 62. The top member 58 may comprise an inlet plate portion 64 and an outlet plate portion 66 which, together with the two side members 60 and 62, defines the interior chamber 30, as best seen in FIG. 2. The inlet plate portion 64 may be provided with an inlet inspection cover 68. Similarly, the outlet plate portion 66 may be provided with an outlet inspection cover 70. The inspection covers 68 and 70 may be removably attached to their respective top plate portions 64 and 66 by any of a wide range of fastening systems and devices that are well known in the art and readily commercially available. By way of example, in one preferred embodiment, the inspection covers 68 and 70 may be attached to the top plate portions 64 and 66 by a plurality of bolt and nut assemblies 72. It is preferred, but not required, that the top member 58 and side members 60 and 62 be mounted to a base member 74 to facilitate mounting of the hood assembly 26 to the top portion 28 of the inlet end 20 of stage loader assembly 12, as best seen in FIGS. 1 and 2. The base member 74 may be attached to the stage loader 12 by any of a wide range of fastening systems and devices, such as by nuts and bolts or by welding.

The various components comprising the hood assembly 26 may be made from any of a wide range of materials suitable for the intended application. By way of example, in one preferred embodiment, the inlet and outlet plate portions 64 and 66 comprising the top member 58 may be fabricated from steel and may be welded together at the apex 86 to form a single piece. Similarly, the two side members 60 and 62, as well as the base plate 74 may also be fabricated from steel and may be welded to each other and to the top member 58 to form a single piece hood assembly 26. The inlet and outlet inspection covers 68 and 70 may also be fabricated from steel, although other materials could also be used.

A vertical baffle member 32 may be affixed to the hood assembly 26 so that it extends between the two side members 60 and 62 and up to the apex 86 of the top member 58 (i.e., to the junction of the inlet and outlet plate portions 64 and 66). The baffle member 32 therefore divides the interior chamber 30 into an inlet chamber 34 and an outlet chamber 36, as best seen in FIG. 2. The baffle member 32 may be provided with a lower baffle portion 38 that extends toward the conveyer system 18 of stage loader 12 and terminates in close proximity to the coal 16 being transferred along the conveyer system 18. The lower baffle member 38 helps to prevent dust 14 contained in the inlet chamber 34 from bypassing the venturi spray assemblies 42 and migrating directly to the outlet chamber 36. In one embodiment, the lower baffle member 38 may be hinged to the baffle member 32 to allow the lower baffle member 38 to swing in the direction indicated by arrow 40, if necessary, to accommodate an increased thickness of the coal bed or larger pieces of coal 16 traveling on the conveyer system 18 of stage loader 12.

The baffle member 32 may be made from any of a wide range of materials suitable for the intended application. In one preferred embodiment, the baffle member 32 comprises steel and may be attached to the hood assembly 26 by any convenient fastening system or device, such as by welding. The lower baffle member 38 may also comprise steel and may be hinged to the upper baffle member 32 to allow the lower baffle member 38 pivot along axis 76 (FIG. 5) to accommodate variations in the coal bed being carried by the conveyer system 18 in the manner already described.

The dust suppression system 10 may also be provided with a plurality of venturi assemblies jet pumps 42 which, The venturi spray assemblies or jet pumps 42 pump or move air from the inlet chamber 34 to the outlet chamber 36. In one preferred embodiment, the venturi spray assemblies or jet pumps 42 are mounted in spaced-apart relation along the upper baffle member 32 in the manner best seen in FIG. 5. More specifically, each venturi assembly 42 is mounted so that its inlet end 44 is exposed to the inlet chamber 34 and so that its outlet end 46 is exposed to the outlet chamber 36. It is preferred, but not required, that each venturi assembly 42 be mounted to the baffle plate 32 so that its outlet end 46 is generally directed downwardly and so that each venturi assembly 42 is generally parallel to the outlet plate 66 of the hood assembly 26, as best seen in FIG. 2. The venturi assemblies 42 may be mounted to the baffle plate by any convenient fastening system or device. By way of example, in one preferred embodiment, each venturi assembly 42 is welded to the upper baffle plate 32.

In one preferred embodiment, five separate venturi assemblies 42 are provided on the upper baffle member 32 in the manner best seen in FIG. 5. However, a greater or fewer number of venturi assemblies 42 may be used depending on the volume flow rate of dust laden air that is to be processed by the pumps 42 in a particular installation. Consequently, the present invention should not be regarded as limited to particular number of venturi assemblies 42 shown and described herein.

With reference now primarily to FIG. 6, the venturi assemblies 42 are essentially identical and may comprise a generally cylindrically shaped outer wall or tube section 78 which defines a central passage or bore 80 therethrough. In one preferred embodiment, the venturi assembly 42 comprises a converging-diverging venturi or nozzle wherein the central passage 80 includes an inlet section 44, a diffusing section 88, a converging section 90, a throat section 92, a diverging section 94, and an outlet section 46. More specifically, the inlet section 44 may comprise a generally rounded or flared inlet mouth which substantially improves the flow into the diffusing section 88 of the venturi 42. The diffusing section 88 may comprise a substantially straight section and forms a transition between the inlet section 44 and the converging section 90. The converging section 90 forms a transition between the diffusing section 88 and the throat section 92. The throat section 92 discharges into the diverging section 94.

An injector nozzle 48 may be mounted within the central bore 80, generally along the central axis 82 of tube section 78. In one preferred embodiment, the injector nozzle 48 is mounted generally in the diffusing and converging sections 88 and 90 so that it discharges into the throat section 92, as shown in FIG. 6. Alternatively, the injector nozzle 48 may be mounted at a slightly different position, depending on the particular shape of the central passage 80 to maximize the performance of the venturi spray assembly 42. The injector nozzle 48 may be connected to a distribution manifold 50 (FIG. 5) which provides a pressurized working fluid 52 (e.g., water) to the nozzle 48. The arrangement of the nozzle 48 within the tube 78 is such that when the pressurized working fluid 52 (e.g., water) is provided to the nozzle 48, the fluid stream 54 exiting the nozzle 48 creates a low pressure zone within the central bore 80 of tube 78. The low pressure zone draws in dust laden air 14 from the inlet end 44. The fluid stream 54 then expels the dust laden air 14 from the outlet end 46 as particle laden mist stream 56. Stated another way, each venturi assembly 42 operates as a jet pump to move or pump air from the inlet chamber 34 to the outlet chamber 36.

The tube section 78 of each venturi assembly 42 may be made from any of a wide range of materials suitable for the intended application. In one preferred embodiment, each tube section 78 may comprise steel tubing. The inside diameters of the various sections (i.e., diffusing section 88, converging section 90, throat section 92 and diverging section 94, as well as the overall lengths of the sections, may be varied depending on the volume flow rate of dust laden air 14 that is to be processed by the pumps 42 in a particular installation. Consequently, the present invention should not be regarded as limited to any particular length or diameter of the tube sections 78 of the venturi spray assemblies 42. By way of example, in one preferred embodiment, each tube section 78 may have an overall outside diameter 11 of about 4 inches and an overall length 13 of about 9 inches. The diffusing section 88 may have a diameter 15 of about 2.5 inches and an overall length 17 of about 2.75 inches. The converging section 90 may have a length 19 of about 0.5 inches and terminates at the throat section 92 which has a diameter 21 of about 2 inches and a length 23 of about 0.75 inches. The diverging section 94 extends from the end of the throat section 92 to the outlet end 46, and forms a diverging angle 25 of about 10 degrees.

The nozzle 48 may comprise any of a wide range of nozzles suitable for discharging the working fluid 52 to form the fluid stream or spray 54. The working fluid 52 used to operate the nozzles 48 may comprise water, although other fluids may be used. By way of example, in one preferred embodiment, each nozzle 48 may comprise a type 1/4HH6.5 nozzle available from FullJet Nozzles which is rated at 1.9 gallons per minute (100 psi inlet water pressure) and 2.3 gallons per minute at 150 psi inlet water pressure.

As was mentioned above, the injector nozzles 48 of the various venturi assemblies 42 are all connected to the distribution manifold 50. An inlet fitting 84 (FIG. 4) may be provided on the end of the distribution manifold 50 to allow the same to be connected to a fluid delivery system (not shown) for providing the working fluid 52 to the manifold 50 at a pressure and flow rate suitable for the operation of the injector nozzles 48. The fluid delivery system (not shown) may comprise any of a wide range of fluid delivery systems that are well-known in the art and readily commercially available. For example, in one preferred embodiment, the fluid delivery system may comprise a conventional mine water delivery system which may deliver water under a pressure in the range of about 250 pounds per square inch gauge (psig) to about 300 psig and at a flow rate sufficient to accommodate the injector nozzles 48 in the venturi spray assemblies 42. Alternatively, the fluid delivery system may comprise a reservoir for holding the working fluid 52, a pump (not shown) connected to the reservoir, and a conduit or pipe (not shown) connecting the pump to the distribution manifold 50. The pump may then be energized to deliver the working fluid 52 to the distribution manifold 50 at the desired pressure and flow rate. However, since such pressurized fluid delivery systems are well known in the art and could be easily provided by persons having ordinary skill in the art after having become familiar with the teachings of the present invention, the particular fluid delivery system utilized in one preferred embodiment of the invention will not be described in further detail herein.

Figure 7:
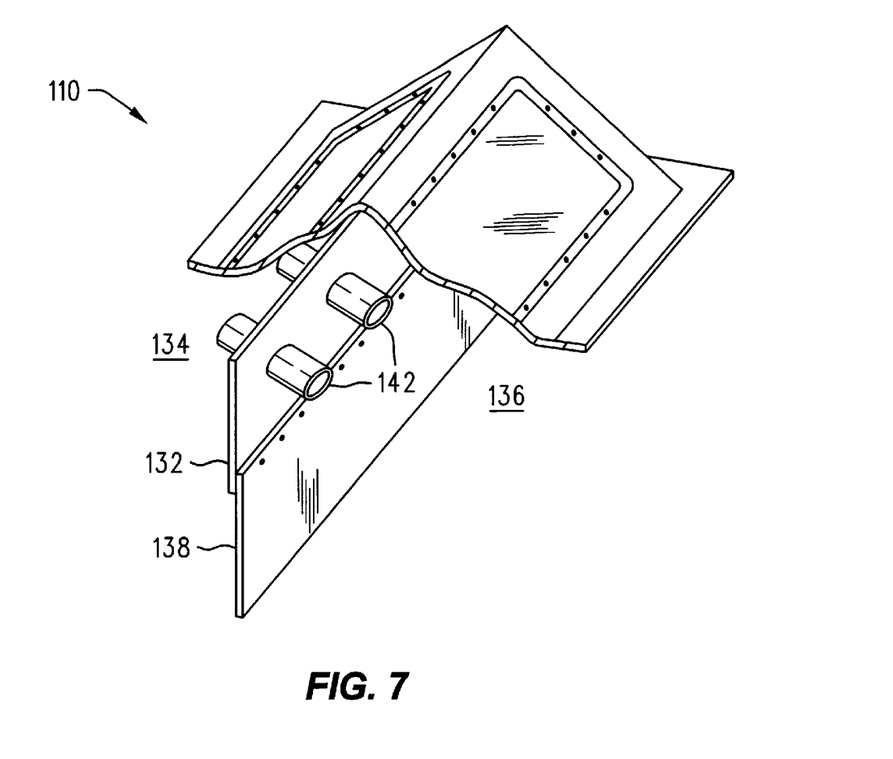
FIG. 7 is a perspective view of a second embodiment of the dust suppression system with a portion of the hood assembly broken away to reveal an alternate baffle member having a flexible lower member.
Figure 8:
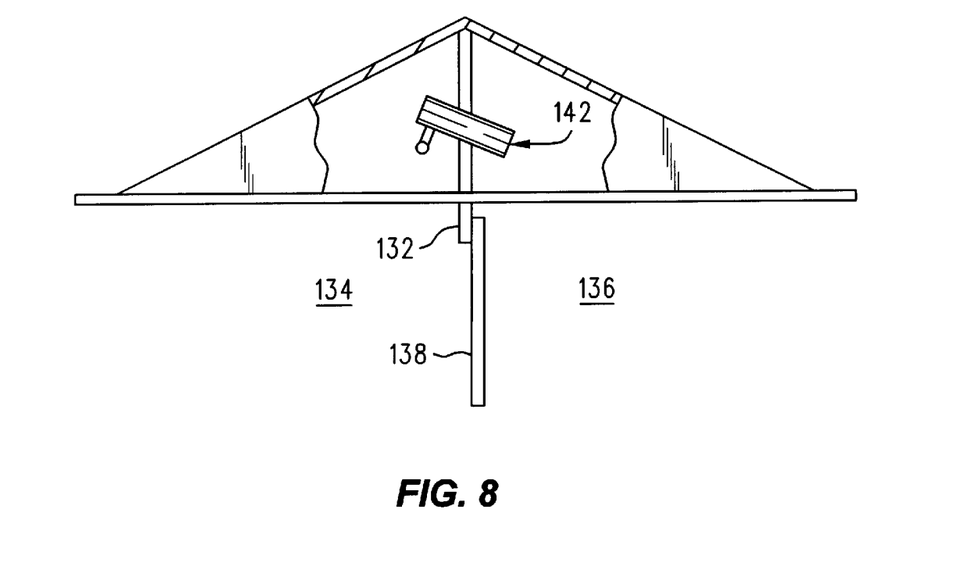
FIG. 8 is a side view in elevation of the second embodiment of the dust suppression system shown in FIG. 7.

A second embodiment 110 of a dust suppression system according to the present invention is shown in FIGS. 7 and 8. The second embodiment 110 is essentially identical to the first embodiment 10 described above, except that the lower baffle member 138 comprises a flexible rubber member. The flexible rubber member comprising the lower baffle member 138 may be attached to the upper baffle member 32 by any of a wide range of convenient fastening systems or devices, such as by screws or bolt and nut assemblies. As was the case for the first embodiment 10, the second embodiment 110 includes a plurality of venturi assemblies 142 that pull dust laden air from the inlet end 134 to the outlet end 136, mixing it with water along the way. The particulate laden mist stream is then sprayed on the outgoing coal.

Figure 9:
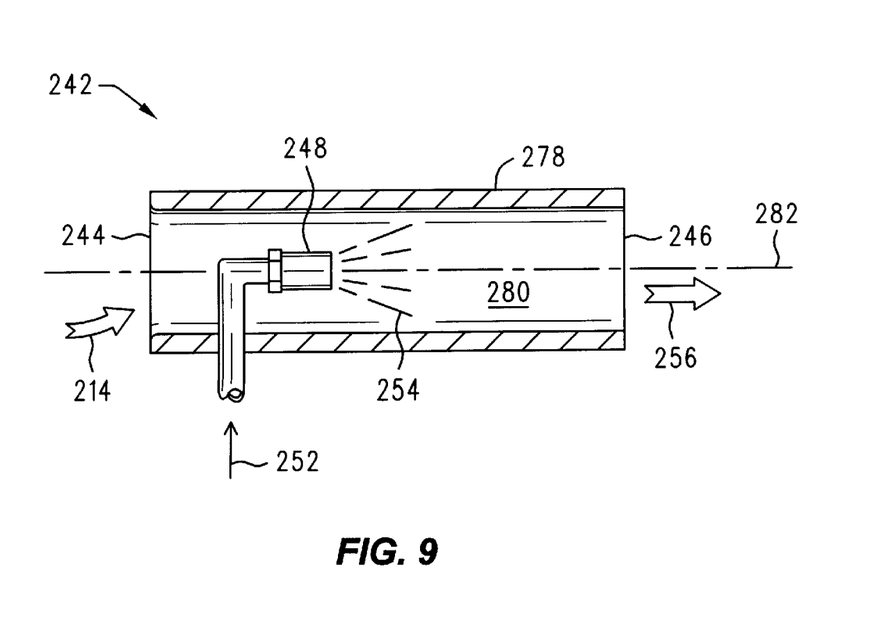
FIG. 9 is a cross-section view in elevation of a second embodiment of a venturi tube and injector nozzle assembly.

The venturi assemblies 142 utilized in the second embodiment 110 may be substantially identical to the venturi assemblies 42 utilized in the first embodiment 10 shown and described above. Alternatively, either embodiment 10, 110 of the dust suppression system described herein may be provided with a simplified venturi spray assembly 242 shown in FIG. 9. The second embodiment 242 of the venturi spray does not have the converging-diverging arrangement of the first embodiment 42 described above. However the second embodiment 242 of the venturi spray assembly generally will produce satisfactory results in many applications. Referring now to FIG. 9, the second embodiment 242 of the venturi spray nozzle may comprise a generally cylindrically shaped tube 278 having an inlet end 244 and an outlet end 246 with a substantially cylindrical central bore 280 therethrough. The injector nozzle 248 may be mounted within the central bore 280, generally along the central axis 282 of bore 280. The arrangement of the nozzle 248 is such that when the pressurized working fluid 252 is provided to the nozzle 248, the fluid stream 254 exiting the nozzle 248 creates a low pressure zone within the central bore 280 of tube 278. The low pressure zone draws in dust laden air 214 from the inlet end 244. The fluid stream 254 then expels the dust laden air 214 from the outlet end 246 as particle laden mist stream 256.

It is contemplated that the inventive concepts herein described may be variously otherwise embodied and it is intended that the appended claims be construed to include alternative embodiments of the invention except insofar as limited by the prior art.

What is claimed is:

1. A dust suppression system for suppressing dust associated with a movement of dust producing material along an open conduit, comprising:
   a hood assembly positioned adjacent the open conduit, said hood assembly defining an interior chamber that is exposed to the dust producing material contained within the open conduit;
   a baffle member associated with said hood assembly for dividing the interior chamber defined by said hood assembly into an inlet chamber and an outlet chamber;
   a venturi assembly defining a conduit having an inlet end and an outlet end, said venturi assembly being mounted to said baffle member so that the inlet end of said venturi assembly is exposed to the inlet chamber and so that the outlet end of said venturi assembly is exposed to the outlet chamber; and
   a fluid injection system connected to said venturi assembly, said fluid injection system injecting a fluid under pressure into the conduit defined by said venturi assembly, the fluid under pressure causing said venturi assembly to operate as a jet pump to pull dust contained within the inlet chamber to the outlet chamber, the fluid combining with a portion of the dust to suppress a release of dust into a surrounding atmosphere.

2. The dust suppression system of claim 1, wherein said venturi assembly comprises:
   a tube having a sidewall defining a bore through said tube; and
   a nozzle mounted within said tube for receiving the fluid under pressure.

3. The dust suppression system of claim 2, wherein said fluid injection system comprises:
   a supply of pressurized fluid; and
   a conduit connected between said supply of pressurized fluid and said nozzle.

4. The dust suppression system of claim 3, wherein said fluid comprises water.

5. The dust suppression system of claim 2, wherein said fluid injection system comprises;
   a supply of fluid;
   a conduit connected between said supply of pressurized fluid and said venturi; and
   a pump operatively associated with said conduit for pressurizing the fluid so that the fluid is delivered to said venturi under pressure.

6. The dust suppression system of claim 1, wherein said hood assembly comprises:
   a first side member positioned adjacent a first side of the open conduit;
   a second side member positioned adjacent a second side of the open conduit, the first and second side members being generally aligned with a direction of movement of the dust producing material along the open conduit; and
   a top member extending between said first and second side members, said first and second side members and said top member defining the interior chamber of said hood assembly.

7. The dust suppression system of claim 6, wherein said baffle member extends between said first side member, said second side member, and said top member and wherein said baffle member also extends toward the open conduit so that said baffle member terminates in close proximity to the dust producing material moving along the open conduit, said baffle member restricting movement of dust from the inlet chamber to the outlet chamber.

8. The dust suppression system of claim 7, further comprising a base member attached to said first and second side members and to said top member at about the peripheries of said first and second side members and said top member, said base member being adapted to be mounted to the open conduit.

9. The dust suppression system of claim 8, wherein said venturi assembly comprises:
   a tube having a sidewall defining a bore through said tube; and
   a nozzle mounted within said tube for receiving the fluid under pressure.

10. The dust suppression system of claim 9, wherein said fluid injection system comprises:
    a supply of pressurized fluid; and
    a conduit connected between said supply of pressurized fluid and said venturi.

11. The dust suppression system of claim 10, wherein said fluid comprises water.

12. A dust suppression system for suppressing dust associated with a movement of dust producing material along an open conduit, comprising:

hood means positioned adjacent the open conduit for defining an interior chamber that is exposed to the dust producing material contained within the open conduit;

baffle means operatively associated with said hood means for dividing the interior chamber defined by said hood means into an inlet chamber and an outlet chamber; and jet pump means operatively associated with said baffle means for pumping dust from the inlet chamber to the outlet chamber.

13. The dust suppression system of claim 12, further comprising fluid injection means operatively associated with said jet pump means for injecting a fluid under pressure into said jet pump means.

14. A dust suppression system for suppressing dust associated with a movement of dust producing material along an open conduit, comprising:

a hood assembly positioned adjacent the open conduit, said hood assembly defining an interior chamber that is exposed to the dust producing material contained within the open conduit;

a baffle member associated with said hood assembly for dividing the interior chamber defined by said hood assembly into an inlet chamber and an outlet chamber;

a tube having a sidewall defining a bore through said tube, the bore having an inlet end and an outlet end, said tube being mounted to said baffle member so that the inlet end of said bore is exposed to the inlet chamber and so that the outlet end of said bore is exposed to the outlet chamber;

a nozzle mounted within said tube; and a fluid injection system connected to said nozzle, said fluid injection system injecting a fluid under pressure into said nozzle.

15. The dust suppression system of claim 14, wherein said hood assembly comprises:

a first side member positioned adjacent a first side of the open conduit;

a second side member positioned adjacent a second side of the open conduit, the first and second side members being generally aligned with a direction of movement of the dust producing material along the open conduit; and a top member extending between said first and second side members, said first and second side members and said top member defining the interior chamber of said hood assembly.

16. The dust suppression system of claim 15, wherein said baffle member extends between said first side member, said second side member, and said top member and wherein said baffle member also extends toward the open conduit so that said baffle member terminates in close proximity to the dust producing material moving along the open conduit, said baffle member restricting movement of dust from the inlet chamber to the outlet chamber.

17. The dust suppression system of claim 16, further comprising a base member attached to said first and second side members and to said top member at about the peripheries of said first and second side members and said top member, said base member being adapted to be mounted to the open conduit.

18. The dust suppression system of claim 17, wherein said fluid injection system comprises:

a supply of pressurized fluid; and a conduit connected between said supply of pressurized fluid and said venturi.

19. The dust suppression system of claim 18, wherein said fluid comprises water.

20. A method for suppressing dust associated with a movement of dust producing material along an open conduit, comprising:

placing a dust suppression hood adjacent the open conduit, the dust suppression hood defining an interior chamber that is exposed to the dust producing material contained within the open conduit, the dust suppression hood including a baffle member that divides the interior chamber defined by the dust suppression hood into an inlet chamber and an outlet chamber, the dust suppression hood also including a venturi having an inlet end exposed to the inlet chamber defined by the dust suppression hood and an outlet end exposed to the outlet chamber defined by the dust suppression hood; and providing a fluid under pressure to the venturi, the fluid causing the venturi to pump dust contained within the inlet chamber to the outlet chamber, the fluid combining with a portion of the dust to suppress a release of dust into a surrounding atmosphere.

21. A dust suppression system for suppressing dust associated with a movement of dust producing material along an open conduit, comprising:

a first side member positioned adjacent a first side of the open conduit;

a second side member positioned adjacent a second side of the open conduit, the first and second side members being generally aligned with a direction of movement of the dust producing material along the open conduit;

a top member extending between said first and second side members, said first and second side members and said top member defining an interior chamber that is exposed to the dust producing material contained within the open conduit;

a baffle member extending between said first side member, said second side member, and said top member and wherein said baffle member also extends toward the open conduit so that said baffle member terminates in close proximity to the dust producing material moving along the open conduit, said baffle member dividing the interior chamber into an inlet chamber and an outlet chamber;

a tube having a sidewall defining a bore through said tube, the bore having an inlet end and an outlet end, said tube being mounted to said baffle member so that the inlet end of said bore is exposed to the inlet chamber and so that the outlet end of said bore is exposed to the outlet chamber;

a nozzle mounted within said tube;

a fluid injection system connected to said nozzle, said fluid injection system injecting a fluid under pressure into said nozzle.

* * * * *